United States Patent [19]

Claypoole et al.

[11] 4,208,200
[45] Jun. 17, 1980

[54] FILAMENT COATING SYSTEM

[75] Inventors: Stewart A. Claypoole, Painted Post; Merrill Lynn, Big Flats; Roger A. Miller, Painted Post, all of N.Y.

[73] Assignee: Corning Glass Works, Corning, N.Y.

[21] Appl. No.: 903,480

[22] Filed: May 8, 1978

[51] Int. Cl.² ............................................. C03B 37/02
[52] U.S. Cl. .................................... 65/11 W; 65/3 C; 65/12; 118/234; 118/405; 118/428
[58] Field of Search ........... 65/3 R, 3 C, 11 R, 11 W, 65/12; 118/20, 234, 405, 420, 428

[56] References Cited

U.S. PATENT DOCUMENTS

| T963,002 | 10/1977 | Albarino et al. | 65/11 R X |
|---|---|---|---|
| 3,540,870 | 11/1970 | Li | 65/3 R |
| 3,717,448 | 2/1973 | Smith | 65/3 C |
| 3,960,530 | 6/1976 | Iyengar | 65/11 W X |
| 4,013,435 | 3/1977 | Kane et al. | 118/420 X |
| 4,116,654 | 9/1978 | Trehu | 65/3 C |
| 4,118,212 | 10/1978 | Aulich et al. | 65/11 W X |

FOREIGN PATENT DOCUMENTS

| 890404 | 2/1962 | United Kingdom | 65/3 C |
| 372189 | 5/1973 | U.S.S.R. | 65/3 R |

*Primary Examiner*—Robert L. Lindsay, Jr.
*Attorney, Agent, or Firm*—William J. Simmons, Jr.; Walter S. Zebrowski

[57] ABSTRACT

Disclosed is an optical waveguide coating system having means for cooling the hot filament prior to the time that the filament enters the coating apparatus. The cooling means comprises an elongated container through which the filament passes. A coolant jacket, which surrounds the container, lowers the temperature of the filament cooling liquid in the container.

6 Claims, 4 Drawing Figures

FILAMENT COATING SYSTEM

BACKGROUND OF THE INVENTION

Glass optical waveguide filaments are remarkably strong as they are drawn, but their strength is greatly affected by physical handling. They must therefore be coated with a protective material before they come in contact with the filament drawing tractors. For a number of reasons including improved diameter control and cleanliness, the tractor should be as close as possible to the draw furnace. High silica content filaments are drawn at temperatures as high as 1850° C. At a drawing speed of 0.5 m/sec the temperature of a 125 μm diameter filament is about 600° C. at a distance of 10 cm from the furnace. It has been possible to apply acceptable coatings to filaments formed at such relatively low drawing speeds.

The economical production of large quantities of optical waveguide filaments will undoubtedly require filament drawing speeds greater than 1 m/sec. As filament drawing speeds approach 1 m/sec, presently constituted filament drawing systems do not afford sufficient time for the filament to cool by natural processes to temperatures which are compatible with application techniques employing presently developed waveguide coating materials. Thus, if a coating is applied from a solvent-containing solution, the hot filament can cause flash evaporation of the solvent vehicle which in turn can cause the resulting coating to be very rough and noncontinuous. If the coating is applied from a 100% solids solution, the hot filament can cause the coating material to set up in the coating apparatus around the filament, thus preventing any further coating material from being applied to the filament.

In a prior filament coating apparatus the filament was contacted by a reinforced felt wick prior to entering the coating tank. This wick allowed the application of a primer precoat to the filament, and it held the filament in the window of an optical micrometer which was employed for monitoring filament diameter. As filament drawing speeds were increased, the temperature of the filament at the wick also increased, thereby causing it to become dry and abrasive to the filament.

SUMMARY OF THE INVENTION

It is therefore an object of the present invention to provide an apparatus for coating glass filaments that are drawn at relatively high drawing speeds. A further object is to provide an apparatus for simultaneously cooling a glass optical filament and applying a precoat thereto prior to the time that the filament reaches the coating tank. In addition to applying a coating, the apparatus should also function to stabilize the filament in the window of the optical micrometer adjacent thereto.

DETAILED DESCRIPTION

Figure 1:
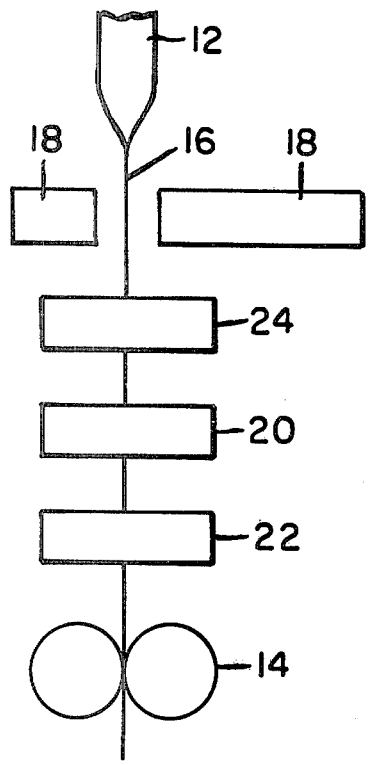
FIG. 1 is a schematic illustration in block diagram form of an optical filament drawing system.

It is to be noted that the drawings are illustrative and symbolic of the present invention and that there is no intention to indicate the scale or relative proportions of the elements shown therein. Although the preferred embodiments described herein relate to the drawing of glass optical waveguide filaments, the method of this invention is applicable to the drawing of filaments of other materials.

The conventional filament drawing system shown in FIG. 1 comprises a mass of glass 12 at least the tip of which is molten, and a pair of tractors 14 for drawing filament from the molten glass. The output of optical micrometer 16 is coupled to a control system which regulates the speed of tractors 14 to control the diameter of the filament. Filament 16 passes through a coater 20 which applies a protective material thereto, and thereafter, it passes through a dryer 22. It may be desirable to employ means 24 for applying a primer coat to the filament to enhance the wetting or the sticking of the protective coat to be applied at coater 20.

As filament drawing speed is increased, the temperature of the filament is higher when it reaches the coater or the primer applicator, if the latter is employed. The detrimental effects of the hotter filament can be overcome by disposing the apparatus of FIG. 2 in the location of the primer applicator 24 of FIG. 1.

Figure 2:
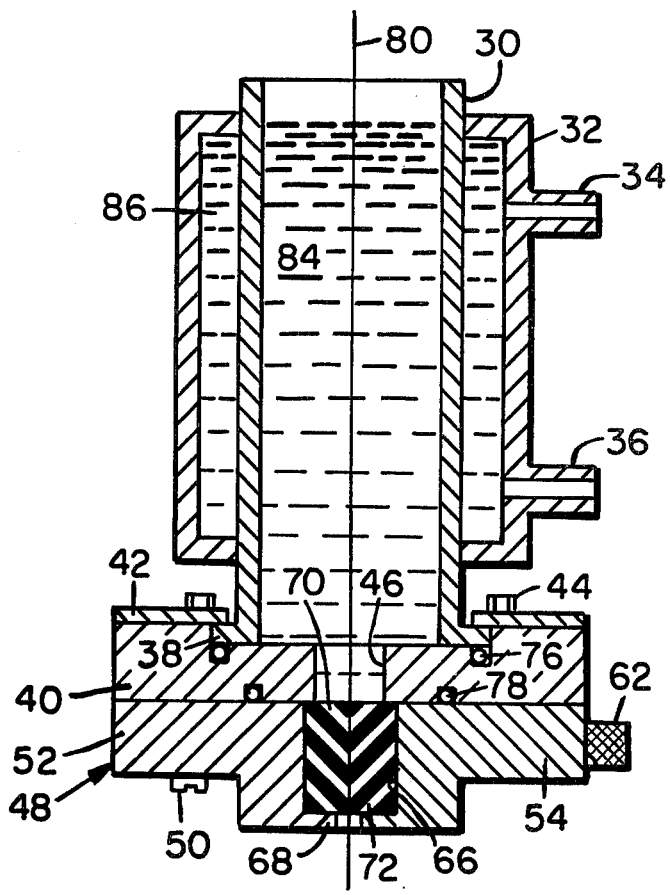
FIG. 2 is a cross-sectional view of the filament cooling apparatus of the present invention.
Figure 3:
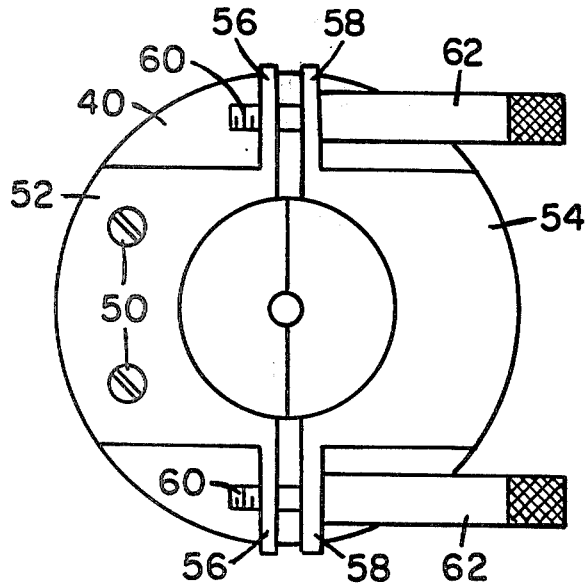
FIG. 3 is a bottom view of the apparatus of FIG. 2.
Figure 4:
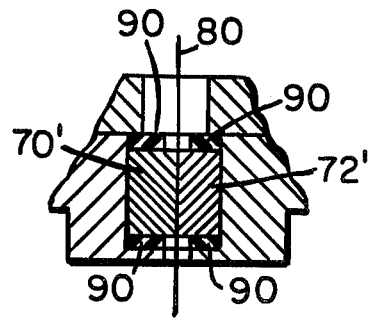
FIG. 4 is a partial cross-sectional view of an alternative wiping die construction.

Referring to FIGS. 2 and 3, there is shown a reservoir 30 surrounded by a coolant jacket 32. Jacket 32 is provided with inlet and outlet pipes 34 and 36, respectively, through which a coolant liquid such as water flows. An end of reservoir 30 is provided with a flange 38 to facilitate the connection of the reservoir to a base member 40. A portion of split washer 42, which is affixed to member 40 by bolts 44, forces flange 38 toward member 40. Member 40 is provided with a relatively large, centrally located aperture 46. A split die block 48 is secured to base member 40 by bolts 50. Die block 48 comprises two sections 52 and 54 which are provided with flanges 56 and 58, respectively. Bolts 60, which are provided with elongated handles 62, extend through bores in flanges 58 and are threaded into threaded bores in flanges 56. A cavity 66 in die block 48 is provided with inwardly projecting flanges 68 at one end thereof. A wiping die comprising two semicylindrical sections 70 and 72 is retained in cavity 66 by flanges 68 and a portion of base member 40. Sections 70 and 72 can be adequately retained by simply wedging them into position. The resultant container is rendered substantially leakproof by O-rings 76 and 78 and wiping die 72. As shown in the embodiment of FIG. 4, means such as split washers 90 can be employed to assist in the retention of sections 70' and 72'. For example, silicone rubber split washers have been employed in conjunction with felt wiping die sections.

A filament 80 is inserted into the filament cooling apparatus of FIG. 2 by removing bolts 60 from flanges 56 so that die block portion 54 can be removed from portion 52. As filament 80 protrudes through aperture 46 and past wiping die section 70, it can be accurately positioned in the center of section 70. The centering procedure can be facilitated by forming a small groove or slit in section 70 into which the filament can be inserted. After filament 80 is centered, die block section 54 is moved into the position illustrated where it is securely retained by tightening bolts 60 into the threaded bores of flanges 56. Reservoir 30 is then filled with filament cooling liquid 84, and liquid 86 can be circulated through coolant jacket 32.

Filament cooling liquid 84 preferably has a high heat of vaporization so that evaporation thereof upon contact with the hot filament assists in the cooling process. Suitable liquids include glycol ethers, glycol acetates, alcohols, acetates, ketones, esters, chlorinated hydrocarbons, fluorinated hydrocarbons and the like. Liquid 84 may also include a material which forms a primer coating on the filament for promoting the adherence or wettability of the protective coating applied by coater 20. In a specific embodiment, liquid 84 consisted of a solution of 0.2% silane and 99.8% acetone. A very thin coating of silane was applied to the glass filament to improve the wettability of the filament by the protective coating material which is applied at coater 20. A liquid height of 6 inches was adequate for cooling a glass filament drawn at a rate of 2 m/sec.

The wiping die may consist of any material which does not unduly abrade the unprotected filament being drawn therethrough, silicone rubber, felt, foamed elastomers and the like being preferred. In addition to being nonabrading, the material should function to seal the bottom of the liquid reservoir as well as adequately wipe liquid 84 from the filament. The wiping die also precisely positions filament 80 in the window of optical micrometer 18 and centers the filament in coater 20.

We claim:

1. Apparatus for coating a glass optical waveguide filament drawn from a region of molten material comprising
    coating means for applying a layer of protective coating material to said filament, and
    filament cooling means disposed between said molten material and said coating means for reducing the temperature of said filament to a value that is not detrimental to said protective coating material, said cooling means comprising a reservoir through which said filament passes, said reservoir containing a coolant liquid having a high heat of vaporization, the portion of said reservoir from which said filament exits having wiping die means for preventing said liquid from flowing therefrom and for wiping excess liquid from said filament.

2. The apparatus of claim 1 wherein said filament consists of glass.

3. An apparatus in accordance with claim 2 wherein said filament cooling liquid is selected from the group consisting of glycol ethers, glycol acetates, alcohols, acetates, ketones, esters, chlorinated hydrocarbons and fluorinated hydrocarbons.

4. The apparatus of claim 3 wherein said coolant liquid includes a primer material which facilitates the application of said protective coating material.

5. The apparatus of claim 4 wherein said wiping die means comprises two sections of wiping material between which said filament is adapted to be disposed.

6. The apparatus of claim 5 wherein at least one of said sections of wiping material contains a slit which is adapted to receive said filament.

* * * * *